(12) United States Patent
Yamashita et al.

(10) Patent No.: US 8,748,563 B2
(45) Date of Patent: Jun. 10, 2014

(54) CURABLE COMPOSITIONS

(75) Inventors: Hiroshi Yamashita, Chiba (JP); Atsushi Sudo, Tokoyo (JP); Takeshi Endo, Yokohoma (JP); Andreas Taden, Duesseldorf (DE); Rainer Schoenfeld, Duesseldorf (DE); Thomas Huver, Deusseldorf (DE); Iris Christa Huver, legal representative, Mettmann (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 13/453,451

(22) Filed: Apr. 23, 2012

(65) Prior Publication Data

US 2012/0301662 A1  Nov. 29, 2012

Related U.S. Application Data

(63) Continuation of application No. PCT/EP2010/064541, filed on Sep. 30, 2010.

(30) Foreign Application Priority Data

Oct. 22, 2009  (EP) .................................... 09173729

(51) Int. Cl.
*C08G 59/68* (2006.01)
*B32B 5/12* (2006.01)
*C08F 283/00* (2006.01)
*C08L 63/00* (2006.01)

(52) U.S. Cl.
USPC ............ 528/408; 428/114; 428/221; 525/523

(58) Field of Classification Search
CPC .. C08G 59/4014; C08G 73/06; C08G 59/687; C08L 63/00; C08K 5/42
USPC ........................................................ 525/523
See application file for complete search history.

(56) References Cited

U.S. PATENT DOCUMENTS

| | | |
|---|---|---|
| 4,607,091 A | 8/1986 | Schreiber |
| 5,021,484 A | 6/1991 | Schreiber et al. |
| 5,200,452 A | 4/1993 | Schreiber |
| 5,443,911 A | 8/1995 | Schreiber et al. |
| 5,543,516 A | 8/1996 | Ishida |
| 6,225,440 B1 | 5/2001 | Ishida |
| 2009/0104363 A1* | 4/2009 | Abi-Karam et al. ........ 427/385.5 |

FOREIGN PATENT DOCUMENTS

| | | | |
|---|---|---|---|
| JP | 2000086863 A | | 3/2000 |
| JP | 2000178332 A | | 6/2000 |
| JP | 2003082099 A | | 3/2003 |
| JP | 2006152172 A | * | 6/2006 |

(Continued)

OTHER PUBLICATIONS

Kohara et al., Computer generated English translation of JP 2006-152172 A, Jun. 15, 2006.*

(Continued)

*Primary Examiner* — Peter F Godenschwager
*Assistant Examiner* — David Karst
(74) *Attorney, Agent, or Firm* — Steven C. Bauman

(57) ABSTRACT

The present invention relates to a curable composition, comprising at least one benzoxazine compound, and at least one sulfonic acid ester having a cyclic structure. In particular, the invention relates to the use of at least one sulfonic acid having a cyclic structure as a heat-activatable catalyst for curable composition, comprising at least one benzoxazine compound.

8 Claims, 2 Drawing Sheets

Time-modulus relationships at 120°C.

(56) References Cited

FOREIGN PATENT DOCUMENTS

| JP | 2007070550 A | 3/2007 |
|---|---|---|
| JP | 2008056795 A | 3/2008 |
| JP | 2009173764 A | 8/2009 |
| WO | 2008034753 A1 | 3/2008 |

OTHER PUBLICATIONS

Kimura, Hajime, et al. "New Type of Phenolic Resin—The Curing Reaction of Bisphenol A Based Benzoxazine with Bisoxazoline and the Properties of the Cured Resin. III. The Cure Reactivity of Benzoxazine with a Latent Curing Agent," Journal of Applied Polymer Sciense, Wiley Periodicals, Inc., vol. 107, 2008, pp. 710-718.

Lee, Sang-do, et al. "Cationic Polymerization Behavior of Isobutyl Vinyl Ether with Arenesulfonates as Non-Salt-Type Latent Thermal Initiators," Journal of Polymer Science: Part A: Polymer Chemistry, John Wiley & Sons, Inc., vol. 37, 1999, pp. 293-301.

* cited by examiner

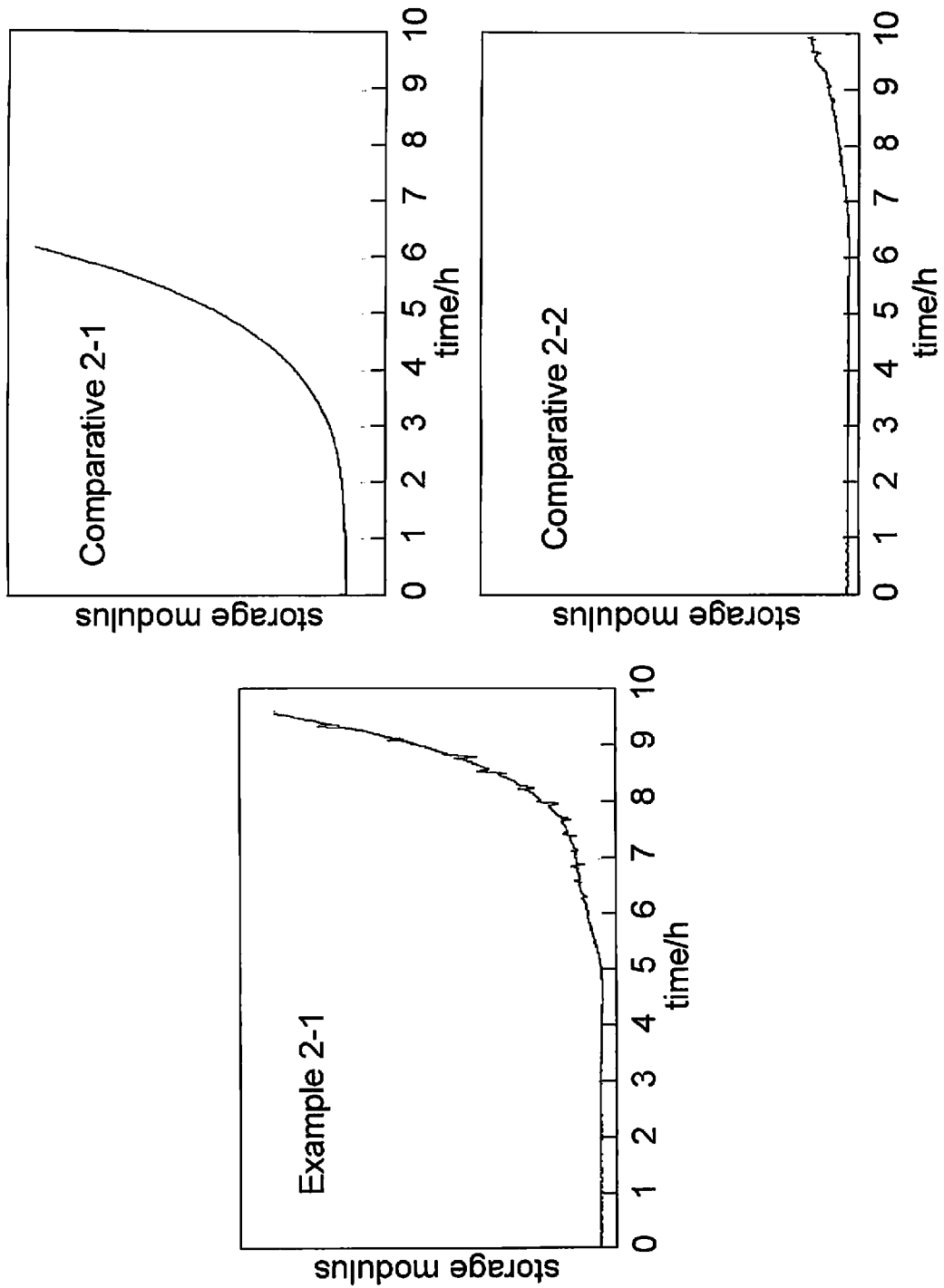
Figure 1. Time-modulus relationships at 120°C.

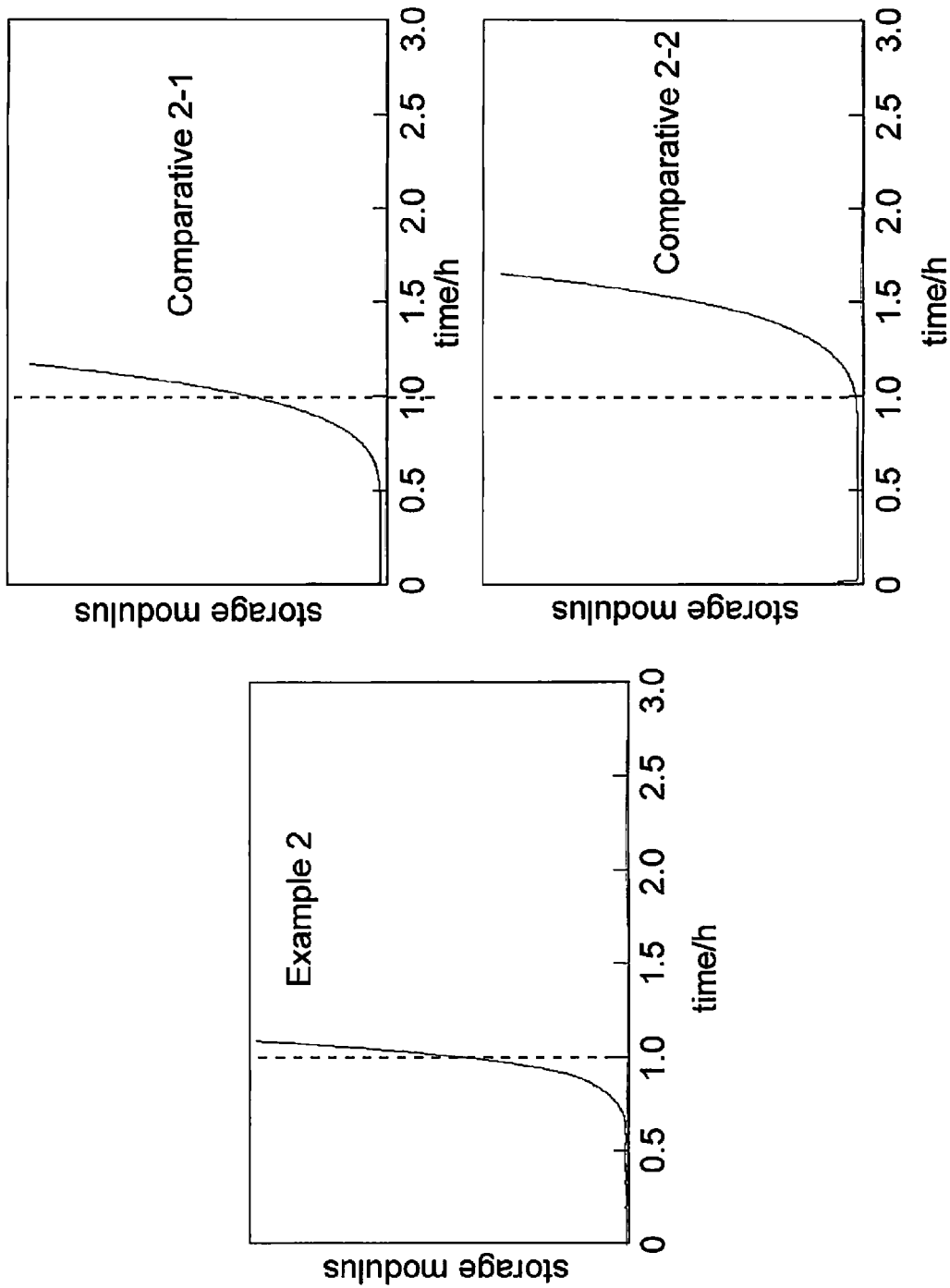
Figure 2. Time-modulus relationships at 150°C.

CURABLE COMPOSITIONS

CROSS-REFERENCE TO RELATED APPLICATIONS

This application is a continuation of International Patent Application No. PCT/EP2010/064541 filed Sep. 30, 2010, which claims priority to European Patent Application No. 09173729.6 filed Oct. 22, 2009, the contents of both of which are incorporated herein by reference.

FIELD OF THE INVENTION

The present invention relates to a curable composition, comprising at least one benzoxazine compound, and at least one sulfonic acid ester having a cyclic structure. In particular, the invention relates to the use of at least one sulfonic acid having a cyclic structure as a heat-activatable catalyst for curable composition, comprising at least one benzoxazine compound.

DESCRIPTION OF THE PRIOR ART

Various catalysts for the polymerization and curing reaction of benzoxazines have been reported. Examples include phenols (JP2000-178332A), amines (JP2000-86863A), imidazoles (JP 2000-178332A), phosphines (JP 2003-82099A) and higher sulfonic acid esters (JP2007-070550A). U.S. Pat. No. 6,225,440 B1 discloses Lewis acids, such as $PCl_5$, $TiCl_4$, $AlCl_3$ as highly active catalysts for benzoxazine-based formulations.

Polymerization and curing reactions with latent/activatable catalysts or initiators, which start the polymerization and curing reaction by an appropriate external stimulus, can offer a method for controlled polymerizations, especially for the control of the initiation step. One example of latent/activatable catalysts are heat-latent or heat-activatable catalysts, which exhibit no activity below a certain temperature ($T_1$) and exhibit a significant activity at a certain temperature ($T_2$). Suitable temperatures $T_1$ and $T_2$ depend on the application of the formulation, but in general, an ideal heat-latent or heat-activatable catalyst exhibits a sharp contrast in its activity between $T_1$ and $T_2$.

Certain applications, such as advanced composite part fabrication processes, require curable formulations, like benzoxazine-based formulations, which exhibit a narrow temperature range between $T_1$ and $T_2$, because a higher $T_1$ reduces the processing viscosity of said formulation, whereas a lower $T_2$ decreases the energy needed to cure the aforementioned formulation.

Combinations of sulfonic acids and amines as heat-latent or heat-activatable catalysts for the curing reaction of benzoxazine-based compositions are known from the Journal of Applied Polymer Science 2008, 107, 710-718. However these combinations do not exhibit a narrow temperature range between $T_1$ and $T_2$.

Japanese patent application No. 2008-56795 teaches a prepreg for a composite material, which comprises a thermosetting resin containing the combination of a benzoxazine resin and an acid catalyst. The acid catalyst can be selected from acyclic esters of p-toluenesulfonic acid. Preferred esters include p-toluenesulfonic acid methyl ester (TsOMe) and p-toluenesulfonic acid ethyl ester (TsOEt). According to test results obtained by the inventors of the present invention, the temperature ranges between $T_1$ and $T_2$ of the aforementioned esters are unsuitable for advanced composite part fabrication processes, such as resin-transfer-molding (RTM) processes.

For example, TsOMe catalyzes the curing reaction of a benzoxazine-based formulation efficiently above 150° C. However, it also catalyzes the curing reaction below 120° C., leading to a poor processability of the benzoxazine-based formulation. TsOEt does not catalyze the curing reaction of a benzoxazine-based formulation below 120° C., but its catalytic activity is insufficient to catalyze efficiently the curing reaction of a benzoxazine-based formulation above 150° C.

Notwithstanding the state of the technology, it would be desirable to provide new benzoxazine-based formulations for advanced composite part fabrication processes, which exhibit a long pot-life, a long open-time and a low processing viscosity at temperatures of 125° C. or less and which can be cured at relatively low temperatures, preferably at temperatures in the range of about 130° C. to about 160° C. in short time periods.

SUMMARY OF THE INVENTION

The inventors of the present invention surprisingly found, that curable compositions, comprising at least one benzoxazine compound and at least one sulfonic acid ester having a cyclic structure can advantageously be used as matrix resins in advanced composite part fabrication processes, such as resin transfer molding processes (RTM), vacuum assisted resin transfer molding processes (VARTM), and resin infusion processes and the like.

Therefore, the present invention provides a curable composition, comprising:

a) at least one benzoxazine compound, and b) at least one sulfonic acid ester of formula (I),

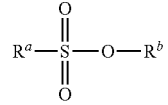

formula (I)

wherein each $R^a$ is independently selected from $C_1$-$C_{40}$ alkyl groups, $C_3$-$C_{40}$ cycloalkyl groups, $C_{3-40}$ alkenyl groups, $C_{3-40}$ alkynyl groups, $C_7$-$C_{40}$ aralkyl groups, or $C_6$-$C_{40}$ aryl groups, and $R^b$ is selected from monocyclic alkyl groups, bicyclic alkyl groups, or tricyclic alkyl groups.

The curable composition of the present invention exhibits a long pot-live, a long open-time and a low processing viscosity at temperatures of 125° C. or less and can be cured at relatively low temperatures, preferably at temperatures in the range of about 130° C. to about 160° C. in short time periods, preferably within a time period of about 5 min to 5 hours.

The curable compositions are in particular suitable as matrices for the preparation of reinforced material such as prepregs and towpregs and/or can be used in injection molding or extrusion processes.

Therefore it is another aspect of the invention to provide a cured reaction product of the curable composition of the present invention, in particular a cured reaction product comprising a plurality of fabric plies or unidirectional plies. It is further provided a process of preparing such material.

In a further aspect of the present invention the at least one sulfonic acid ester of the present invention is used as a heat-activatable catalyst for the curing reaction of benzoxazine compounds.

DETAILED DESCRIPTION OF THE PRESENT INVENTION

The curable composition of the present invention comprises at least one benzoxazine compound.

The benzoxazine compound can be any curable monomer, oligomer or polymer comprising at least one benzoxazine moiety. Preferably monomers containing up to four benzoxazine moieties are employed as the benzoxazine compound in form of single compounds or mixtures of two or more different benzoxazines.

In the following a broad spectrum of different suitable benzoxazine compound, containing one to four benzoxazine moieties are presented.

One possible benzoxazine compound may be embraced by the following structure (B-I):

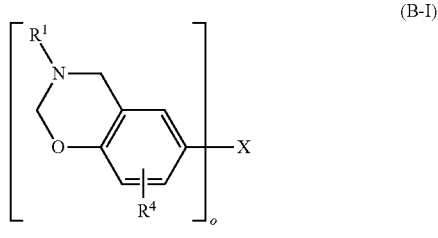

(B-I)

where o is 1 to 4, X is selected from a direct bond (when o is 2), alkyl (when o is 1), alkylene (when o is 2-4), carbonyl (when o is 2), oxygen (when o is 2), thiol (when o is 1), sulfur (when o is 2), sulfoxide (when o is 2), and sulfone (when o is 2), $R^1$ is selected from hydrogen, alkyl, alkenyl and aryl, and $R^4$ is selected from hydrogen, halogen, such as fluorine, chlorine, bromine or iodine, alkyl and alkenyl, or $R^4$ is a divalent residue creating a naphthoxazine residue out of the benzoxazine structure.

More specifically, within structure (B-I) the benzoxazine compound may be embraced by the following structure (B-II):

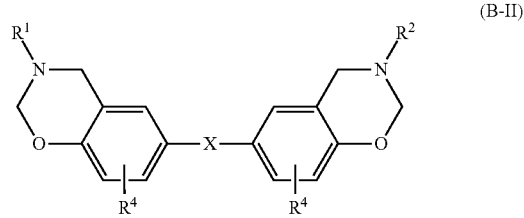

(B-II)

where X is selected from a direct bond, $CH_2$, $C(CH_3)_2$, $C=O$, O, S, $S=O$ and $O=S=O$, $R^1$ and $R^2$ are the same or different and are selected from hydrogen, alkyl, such as methyl, ethyl, propyls and butyls, alkenyl, such as allyl, and aryl, and $R^4$ are the same or different and defined as above.

Representative benzoxazine compound within structure (B-II) include:

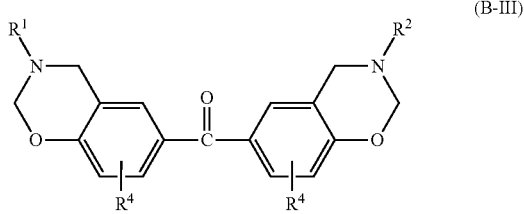

(B-III)

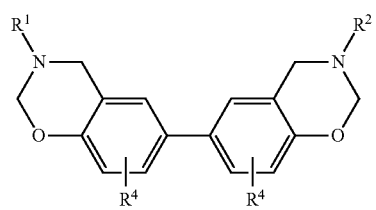

(B-IV)

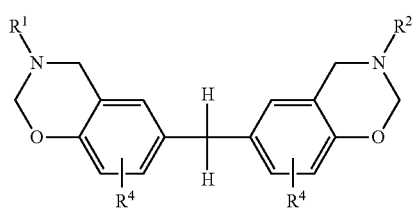

(B-V)

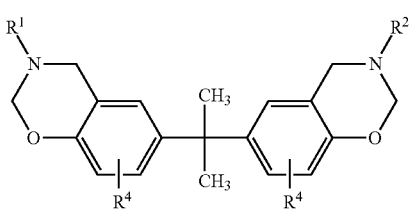

(B-VI)

wherein $R^1$, $R^2$ and $R^4$ are as defined above.

Alternatively, the benzoxazine compound may be embraced by the following structure (B-VII):

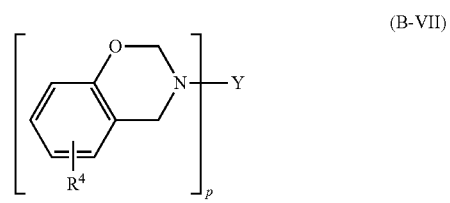

(B-VII)

wherein p is 2, Y is selected from biphenyl, diphenyl methane, diphenyl isopropane, diphenyl sulfide, diphenyl sulfoxide, diphenyl sulfone, and diphenyl ketone, and $R^4$ is selected from hydrogen, halogen, alkyl and alkenyl.

Though not embraced by structures (B-I) or (B-VII) additional benzoxazine compounds are within the following structures:

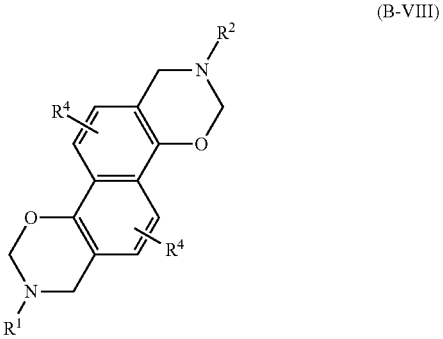

(B-VIII)

(B-IX)

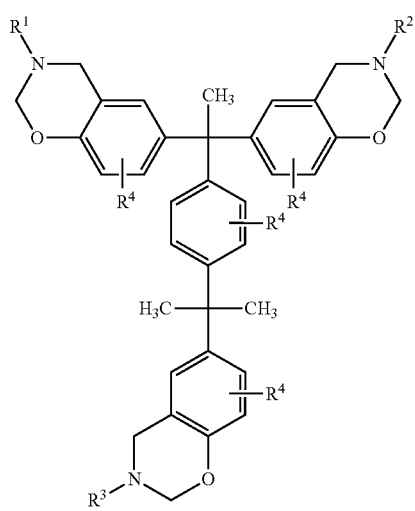

(B-X)

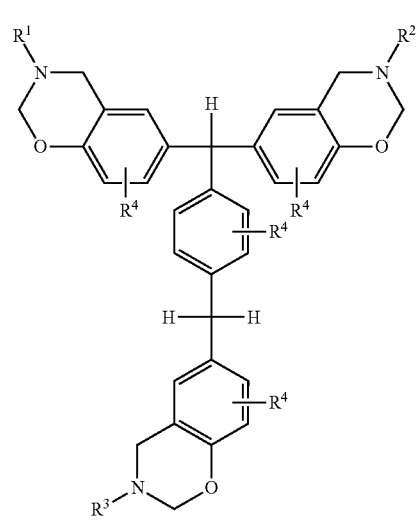

wherein $R^1$, $R^2$ and $R^4$ are as defined above, and $R^3$ is defined as $R^1$, $R^2$ or $R^4$.

Specific examples of the above generically described benzoxazine compounds include:

(B-XI)

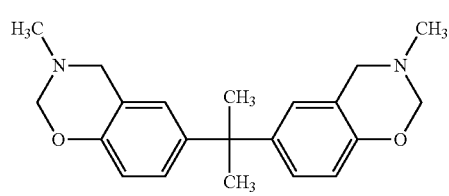

(B-XII)

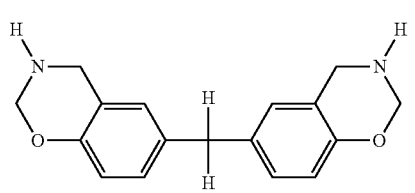

(B-XIII)

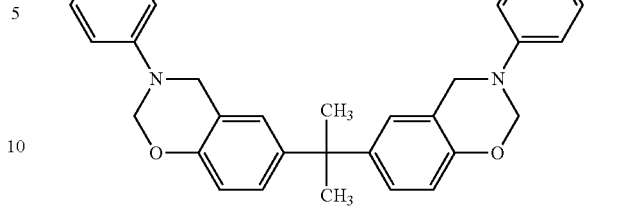

(B-XIV)

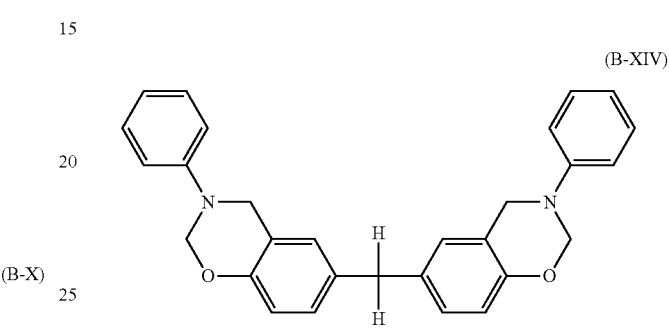

(B-XV)

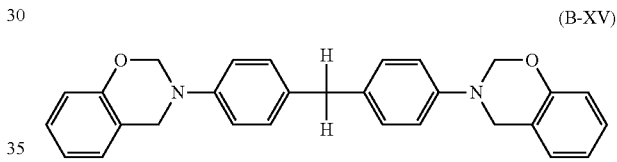

(B-XVI)

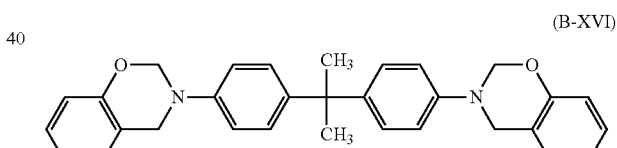

(B-XVII)

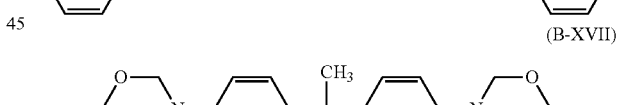

(B-XVIII)

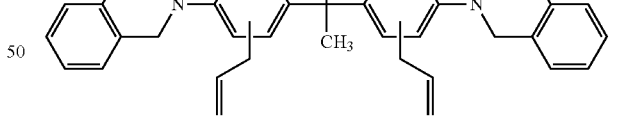

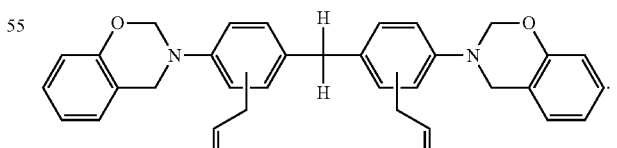

Different benzoxazine compounds may be used to practice the invention, such as combinations of multifunctional benzoxazines and monofunctional benzoxazines, or combinations of one or more multifunctional benzoxazines or one or more monofunctional benzoxazines.

Examples of monofunctional benzoxazine compounds may be embraced by the following structure (B-XIX):

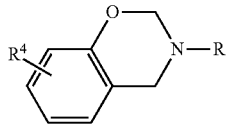
(B-XIX)

wherein R is alkyl, such as methyl, ethyl, propyl and butyl, alkenyl or aryl with or without substitution on one, some or all of the available substitutable sites, and $R^4$ is selected from hydrogen, halogen, alkyl and alkenyl, or $R^4$ is a divalent residue creating a naphthoxazine residue out of the benzoxazine structure.

For instance, monofunctional benzoxazine compounds may be embraced by general structure (B-XX):

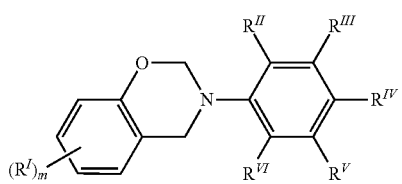
(B-XX)

where in this case $R^I$ is selected from alkyl, alkenyl, each of which being optionally substituted or interrupted by one or more O, N, S, C=O, COO, and NHC=O, and aryl; m is 0 to 4; and $R^{II}$, $R^{III}$, $R^{IV}$, $R^V$ and $R^{VI}$ are independently selected from hydrogen, alkyl, alkenyl, each of which being optionally substituted or interrupted by one or more O, N, S, C=O, COOH, and NHC=O, and aryl.

Specific examples of such a monofunctional benzoxazine compounds are:

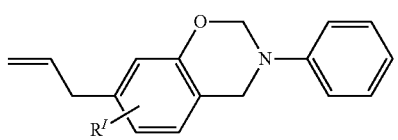
(B-XXI)

where $R^I$ is as defined above; or

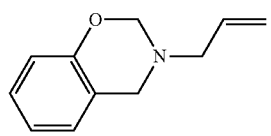
(B-XXII)

Benzoxazine compounds are presently available commercially from several sources, including Huntsman Advanced Materials; Georgia-Pacific Resins, Inc.; and Shikoku Chemicals Corporation, Chiba, Japan, the last of which offers among others Bisphenol A-aniline, Bisphenol A-methylamin, Bisphenol F-aniline benzoxazine resins.

In a particularly preferred embodiment of the present invention the benzoxazine compound is an "aliphatic benzoxazine", i.e. a benzoxazine having aliphatic residues bound to the nitrogen atoms of the benzoxazine residue, such as the compound of formula (B-XI) above. However in another preferred embodiment it can be desirable to use "aromatic benzoxazines", i.e. benzoxazines having aromatic residues bound to the nitrogen atoms of the benzoxazine residues such as the compounds of formulas (B-XV) or (B-XX). In some other preferred embodiments mixtures of the before-mentioned benzoxazines are advantageously employed.

If desired, however, instead of using commercially available sources, the benzoxazine compound may typically be prepared by reacting a phenolic compound, preferably selected from monophenols and/or diphenols such as biphenyl-4,4'-diol (also known as "4,4'-Biphenol"), Bisphenol A, Bisphenol P, Bisphenol M, Bisphenol F, Bisphenol S, Bisphenol AP, Bisphenol E, 4,4'-oxydiphenol, 4,4'-thiodiphenol, bis(4-hydroxyphenyl)methanone, biphenyl-2,2'-diol, 4,4'-(cyclohexane-1,1-diyl)diphenol or 4,4'-(3,3,5-trimethylcyclohexane-1,1-diyl)diphenol (Bisphenol TMC), with an aldehyde and an alkyl or aryl amine. U.S. Pat. No. 5,543,516, hereby expressly incorporated herein by reference, describes a method of forming benzoxazines, where the reaction time can vary from a few minutes to a few hours, depending on reactant concentration, reactivity and temperature. See generally U.S. Pat. No. 4,607,091 (Schreiber), U.S. Pat. No. 5,021,484 (Schreiber), U.S. Pat. No. 5,200,452 (Schreiber) and U.S. Pat. No. 5,443,911 (Schreiber).

Any of the before-mentioned benzoxazine compounds may contain partially ring-opened benzoxazine structures. However, for the purpose of this invention those structures are still considered to be benzoxazine moieties, in particular ring-opened benzoxazine moieties.

The benzoxazine compound is preferably the only curable ingredient in the curable compositions of the present invention. However other curable ingredients or resins can be included, if desired.

The at least one benzoxazine compound or mixtures of different benzoxazine compounds can be included in an amount in the range of 20 to 99.9 percent by weight, such as 40 to 98 percent by weight, desirably in an amount of 50 to 95 percent by weight, and more desirably in an amount of 60 to 90 percent by weight, based on the total amount of the curable composition of the present invention.

As noted above, the curable composition of the present invention additionally comprises at least one sulfonic acid ester as a heat-latent or heat-activatable catalysts for the curing reaction of the at least one benzoxazine compound. The sulfonic acid ester exhibits no significant activity below a certain temperature ($T_1$) and exhibit a significant activity at a certain temperature ($T_2$). Additionally the sulfonic acid ester of the present invention is characterized by its sharp contrast in activity between $T_1$ and $T_2$.

The sulfonic acid ester of the present invention is a compound of formula (I),

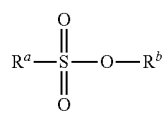
formula (I)

wherein each $R^a$ is independently selected from $C_1$-$C_{40}$ alkyl groups, $C_3$-$C_{40}$ cycloalkyl groups, $C_{3\text{-}40}$ alkenyl groups, $C_{3\text{-}40}$ alkynyl groups, $C_7$-$C_{40}$ aralkyl groups, or $C_6$-$C_{40}$ aryl groups, and $R^b$ is selected from monocyclic alkyl groups, bicyclic alkyl groups, or tricyclic alkyl groups.

The term "$C_{1-40}$ alkyl" as used in the present invention denotes branched and unbranched alkyl groups with 1 to 40 carbon atoms. Preferred are alkyl groups with 1 to 4 carbon atoms. Examples include: methyl, ethyl, n-propyl, iso-propyl, n-butyl, iso-butyl, sec-butyl, tert-butyl, n-pentyl, iso-pentyl, neo-pentyl or hexyl. The definitions propyl, butyl, pentyl and hexyl include all possible isomeric forms of the groups in question. Thus, for example, propyl includes n-propyl and iso-propyl, butyl includes iso-butyl, sec-butyl and tert-butyl etc. Unless otherwise stated, the alkyl groups may be substituted by one or more groups preferably selected from methyl, ethyl, iso-propyl, tert-butyl, hydroxy, fluorine, chlorine, bromine and iodine.

The term "$C_{3-40}$ cycloalkyl" as used in the present invention denotes cyclic alkyl groups with 3 to 40 carbon atoms. Examples include: cylopropyl, cyclobutyl, cyclopentyl or cyclohexyl. Unless otherwise stated, the cyclic alkyl groups may be substituted by one or more groups preferably selected from among methyl, ethyl, iso-propyl, tert-butyl, hydroxy, fluorine, chlorine, bromine and iodine.

The term "$C_{3-40}$ alkenyl" as used in the present invention denotes branched and unbranched alkenyl groups with 3 to 40 carbon atoms. Preferred are alkenyl groups with 3 to 5 carbon atoms. Examples include: propenyl, butenyl, pentenyl, or hexenyl. Unless otherwise stated, the definitions propenyl, butenyl, pentenyl and hexenyl include all possible isomeric forms of the groups in question. Thus, for example, propenyl includes 1-propenyl and 2-propenyl, butenyl includes 1-, 2- and 3-butenyl, 1-methyl-1-propenyl, 1-methyl-2-propenyl etc.

The term "$C_{3-40}$ alkynyl" as used in the present invention denotes branched and unbranched alkynyl groups with 3 to 40 carbon atoms. Preferred are alkynyl groups with 3 to 5 carbon atoms. Examples include: propynyl, butynyl, pentynyl or hexynyl. Unless otherwise stated, the definitions propynyl, butynyl, pentynyl and hexynyl include all possible isomeric forms of the groups in question. Thus, for example, propynyl includes 1-propynyl and 2-propynyl, butynyl includes 1-, 2- and 3-butynyl, 1-methyl-1-propynyl, 1-methyl-2-propynyl etc.

The term "$C_6$-$C_{40}$ aryl" as used in the present invention denotes aromatic ring systems with 6 to 40 carbon atoms. Examples include: phenyl, naphthyl and anthracenyl, the preferred aryl group being phenyl and napthyl. Unless otherwise stated, the aromatic groups may be substituted by one or more groups preferably selected from among methyl, ethyl, iso-propyl, tert-butyl, hydroxy, alkoxy, such as methoxy or ethoxy, fluorine, chlorine, bromine, iodine and nitro.

The term "$C_{7-40}$ aralkyl" as used in the present invention denotes branched and unbranched alkyl groups with 1 to 30 carbon atoms which are substituted by an aromatic ring system with 6 or 10 carbon atoms. Examples include: benzyl, 1- or 2-phenylethyl. Unless otherwise stated, the aromatic groups may be substituted by one or more groups preferably selected from among methyl, ethyl, iso-propyl, tert-butyl, hydroxy, fluorine, chlorine, bromine and iodine.

The catalytic activity and activation temperature of the sulfonic acid ester of the present invention can be simply controlled by varying the steric bulk and electronic nature of residue $R^a$. Preferred residues $R^a$ are independently selected from methyl, ethyl, trifluoromethyl, phenyl, ortho-nitrophenyl, meta-nitrophenyl, para-nitrophenyl, ortho-tolyl, meta-tolyl, para-tolyl, 2,4,6-trimethylphenyl, ortho-trifluoromethylphenyl, meta-trifluoromethylphenyl, para-trifluoromethylphenyl, ortho-methoxyphenyl, meta-methoxyphenyl, or para-methoxyphenyl.

The term "monocyclic alkyl group" as used in the present invention denotes saturated or partially unsaturated (containing 1 or 2 double bonds) cyclic hydrocarbon groups containing one ring system. Preferably the monocyclic alkyl group comprises 3 to 20 carbon ring atoms, more preferably 5 to 8 carbon ring atoms, such as 5, 6, 7 or 8 carbon ring atoms, wherein 6 carbon ring atoms are being preferred.

The term "carbon ring atom" as used in the present invention refers the total number of carbon atom forming the ring system.

Unless otherwise stated, the monocyclic alkyl group can optionally be benzocondensed, such as, e.g., tetralinyl and/or may be substituted by one or more groups preferably selected from oxo, hydroxyl, amine, cyanide, halogen, linear, branched, saturated or unsaturated $C_1$-$C_{40}$ alkyl, linear, branched, saturated or unsaturated $C_1$-$C_{40}$ haloalkyl, $C_7$-$C_{40}$ aralkyl, or $C_6$-$C_{40}$ aryl.

In one embodiment of the present invention the monocyclic alkyl group $R^b$ is substituted with one or more additional sulfonate ester group(s) of formula ($R^a SO_3$—*), wherein $R^a$ is defined as above.

In another embodiment of the present invention the monocyclic alkyl group $R^b$ is not substituted with one additional or more than one additional sulfonate ester group(s) of formula ($R^a SO_3$—*), wherein $R^a$ is defined as above.

In a preferred embodiment $R^b$ of formula (I) is a monocyclic alkyl group, comprising 3 to 20 carbon ring atoms, and said monocyclic alkyl group being optionally substituted by at least one substituent selected from oxo, hydroxyl, amine, cyanide, halogen, linear, branched, saturated or unsaturated $C_1$-$C_{40}$ alkyl, linear, branched, saturated or unsaturated $C_1$-$C_{40}$ haloalkyl, $C_7$-$C_{40}$ aralkyl, or $C_6$-$C_{40}$ aryl.

Preferred monocyclic alkyl groups include cyclopropyl, cyclobutyl, cyclopentyl, cyclohexyl, cycloheptyl, cyclooctyl, cyclodecyl and cyclododecyl.

In a particular preferred embodiment of the present invention the monocyclic alkyl group $R^b$ is a cyclohexyl group.

Sulfonic acid ester of the present invention having a cyclohexyl group as residue $R^b$ are preferred because these sulfonic acid esters are highly stable at temperatures of 125° C. or less and are efficiently transferred in their catalytically active form at temperatures of more (or equal) than 130° C.

The term "bicyclic alkyl group" as used in the present invention denotes saturated or partially unsaturated (containing 1 or 3 double bonds) cyclic hydrocarbon groups containing two ring systems. Preferably the bicyclic alkyl group comprises 8 to 40 carbon ring atoms, more preferably 10 to 30 carbon ring atoms.

Unless otherwise stated, the bicyclic alkyl group may be substituted by one or more groups preferably selected from oxo, hydroxyl, amine, cyanide, halogen, linear, branched, saturated or unsaturated $C_1$-$C_{40}$ alkyl, linear, branched, saturated or unsaturated $C_1$-$C_{40}$ haloalkyl, $C_7$-$C_{40}$ aralkyl, or $C_6$-$C_{40}$ aryl. Preferred bicyclic alkyl groups include cis- or trans-decahydronaphthalenyl.

In one embodiment of the present invention the bicyclic alkyl group $R^b$ is substituted with one or more additional sulfonate ester group(s) of formula ($R^a SO_3$—*), wherein $R^a$ is defined as above.

In another embodiment of the present invention the bicyclic alkyl group $R^b$ is not substituted with one additional or more than one additional sulfonate ester group(s) of formula ($R^a SO_3$—*), wherein $R^a$ is defined as above.

The term "triyclic alkyl group" as used in the present invention denotes saturated or partially unsaturated (containing 1 or 3 double bonds) cyclic hydrocarbon groups containing three ring systems. Preferably the tricyclic alkyl group comprises 10 to 40 carbon ring atoms, more preferably 14 to 30 carbon ring atoms.

Unless otherwise stated, the tricyclic alkyl group may be substituted by one or more groups preferably selected from oxo, hydroxyl, amine, cyanide, halogen, linear, branched, saturated or unsaturated $C_1$-$C_{40}$ alkyl, linear, branched, saturated or unsaturated $C_1$-$C_{40}$ haloalkyl, $C_7$-$C_{40}$ aralkyl, or $C_6$-$C_{40}$ aryl.

Preferred tricyclic alkyl groups include tetradecahydroanthracenyl.

In one embodiment of the present invention the tricyclic alkyl group $R^b$ is substituted with one or more additional sulfonate ester group(s) of formula ($R^aSO_3$—*), wherein $R^a$ is defined as above.

In another embodiment of the present invention the tricyclic alkyl group $R^b$ is not substituted with one additional or more than one additional sulfonate ester group(s) of formula ($R^aSO_3$—*), wherein $R^a$ is defined as above.

In a further embodiment of the present invention the sulfonic acid ester of formula (I) is a mono-sulfonic acid ester, which means that the sulfonic acid ester of formula (I) only comprises one sulfonate ester group(s) of formula ($R^aSO_3$—*) and is not substituted with one additional or more than one additional sulfonate ester group(s) of formula ($R^aSO_3$—*), wherein $R^a$ is defined as above.

The at least one sulfonic acid ester of the present invention can be selected from compounds of formula (Ia),

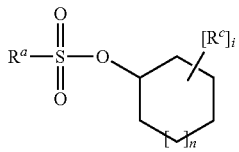

formula (Ia)

wherein $R^a$ is defined as above, n is an integer selected from 0 to 3, i is an integer from 0 to 3, and each $R^c$, if present, is independently selected from hydroxyl; amine; cyanide; halogen; linear, branched, saturated or unsaturated $C_1$-$C_{40}$ alkyl; linear, branched, saturated or unsaturated $C_1$-$C_{40}$ haloalkyl; $C_7$-$C_{40}$ aralkyl; or $C_6$-$C_{40}$ aryl.

In a preferred embodiment of the present invention n is 1 and i is 0, 1 or 2. Preferably $R^C$ is selected from linear $C_1$-$C_4$ alkyl groups.

The at least one sulfonic acid ester of the present invention can also be selected from compounds of formula (Ib),

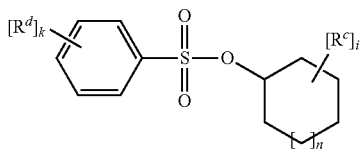

formula (Ib)

wherein n is an integer selected from 0 to 3, i is an integer from 0 to 3, k is an integer selected from 0 to 3, each $R^c$, if present, is independently selected from hydroxyl; amine; cyanide; halogen; linear, branched, saturated or unsaturated $C_1$-$C_{40}$ alkyl; linear, branched, saturated or unsaturated $C_1$-$C_{40}$ haloalkyl; $C_7$-$C_{40}$ aralkyl; or $C_6$-$C_{40}$ aryl and each $R^d$, if present, is selected from linear $C_1$-$C_4$ alkyl or linear $C_1$-$C_4$ haloalkyl.

In a preferred embodiment of the present invention n is 1, i is 0 or 1, k is 0 or 1 and $R^c$ and $R^d$ if present, are independently selected from linear $C_1$-$C_4$ alkyl or linear $C_1$-$C_4$ haloalkyl.

The at least one sulfonic acid ester of the present invention can further be selected from compounds of formulae (II) to (VI),

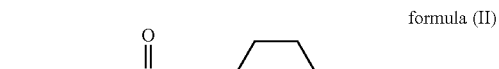

formula (II)

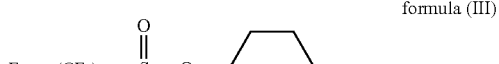

formula (III)

formula (IV)

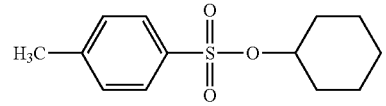

formula (V)

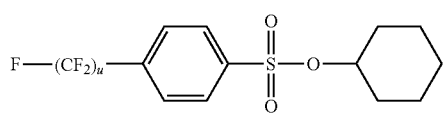

formula (VI)

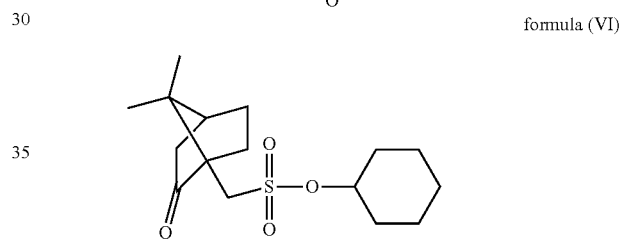

wherein u is an integer from 1 to 18, preferably from 1 to 6. In a particular preferred embodiment u is 1.

The sulfonic acid ester of the present invention can be prepared according to any method, such as a method described by Endo et al. in the Journal of Polymer Science: Part A: Polymer Chemistry, Vol. 37, 293-301 (1999). This publication teaches the synthesis of different sulfonic acid esters of formula (I) and their use as latent thermal initiators in the cationic polymerization of isobutyl vinyl ether.

The at least one sulfonic acid ester of formula (I) or mixtures of different sulfonic acid esters of formula (I) can be included in an amount in the range of 0.1 to 20 percent by weight, such as 0.2 to 5 percent by weight, desirably in an amount of 0.3 to 3 percent by weight, and more desirably in an amount of 0.5 to 1.5 percent by weight, based on the total amount of the curable composition of the present invention.

The curable composition of the present invention may comprise the benzoxazine compound and the sulfonic acid ester of general formula (I) in an amount that the molar ratio of benzoxazine moieties to sulfonate ester groups ($R^aSO_3$—*) is in the range of 90:10 to 99.9:0.1, preferably in the range of 95:5 to 99.5:0.5. A higher amount of the sulfonic acid ester component of the present invention could cause the deterioration of mechanical and thermal properties of the resulting cured reaction product, whereas a smaller amount of the sulfonic acid ester of the present invention could lead to inefficient curing reactions.

The curable compositions of the present invention may further comprise other resins apart from the benzoxazine compound, such as epoxy resins.

The term "epoxy resin", as used in the present invention, refers to any organic compound having at least two functional groups of oxirane type which can be polymerized by ring opening. The term "epoxy resin" preferably denotes any conventional epoxy resin which is liquid at room temperature (23° C.) or at a higher temperature. These epoxy resins can be monomeric or polymeric, on the one hand, aliphatic, cycloaliphatic, heterocyclic or aromatic, on the other hand.

The epoxy resins used in the present invention may include multifunctional epoxy-containing compounds, such as $C_1$-$C_{28}$ alkyl-, poly-phenol glycidyl ethers; polyglycidyl ethers of pyrocatechol, resorcinol, hydroquinone, 4,4'-dihydroxydiphenyl methane (or bisphenol F, such as RE-303-S or RE-404-S available commercially from Nippon Kayuku, Japan), 4,4'-dihydroxy-3,3'-dimethyldiphenyl methane, 4,4'-dihydroxydiphenyl dimethyl methane (or bisphenol A), 4,4'-dihydroxydiphenyl methyl methane, 4,4'-dihydroxydiphenyl cyclohexane, 4,4'-dihydroxy-3,3'-dimethyldiphenyl propane, 4,4'-dihydroxydiphenyl sulfone, and tris(4-hydroxyphenyl) methane; polyglycidyl ethers of transition metal complexes; chlorination and bromination products of the above-mentioned diphenols; polyglycidyl ethers of novolacs; polyglycidyl ethers of diphenols obtained by esterifying ethers of diphenols obtained by esterifying salts of an aromatic hydrocarboxylic acid with a dihaloalkane or dihalogen dialkyl ether; polyglycidyl ethers of polyphenols obtained by condensing phenols and long-chain halogen paraffins containing at least two halogen atoms; phenol novolac epoxy; cresol novolac epoxy; and combinations thereof.

Among the commercially available epoxy resins suitable for use in the present invention are polyglycidyl derivatives of phenolic compounds, such as those available under the tradenames EPON 825, EPON 826, EPON 828, EPON 1001, EPON 1007 and EPON 1009, cycloaliphatic epoxy-containing compounds such as Araldite CY179 from Huntsman or waterborne dispersions under the tradenames EPI-REZ 3510, EPI-REZ 3515, EPI-REZ 3520, EPI-REZ 3522, EPI-REZ 3540 or EPI-REZ 3546 from Hexion; DER 331, DER 332, DER 383, DER 354, and DER 542 from Dow Chemical Co.; GY285 from Huntsman, Inc.; and BREN-S from Nippon Kayaku, Japan. Other suitable epoxy resins include polyepoxides prepared from polyols and the like and polyglycidyl derivatives of phenol-formaldehyde novolacs, the latter of which are available commercially under the tradenames DEN 431, DEN 438, and DEN 439 from Dow Chemical Company and a waterborne dispersion ARALDITE PZ 323 from Huntsman.

Cresol analogs are also available commercially such as ECN 1273, ECN 1280, ECN 1285, and ECN 1299 or waterborne dispersions ARALDITE ECN 1400 from Huntsman, Inc. SU-8 and EPI-REZ 5003 are bisphenol A-type epoxy novolacs available from Hexion.

Of course, combinations of the different epoxy resins are also desirable for use herein.

If present, the epoxy resin can be used in the curable composition of the present invention in an amount in the range of 0.1 to 60 percent by weight, more preferably in an amount of 5 to 50 and most preferably in an amount of 10 to 30 percent by weight, based on the total amount of the curable composition.

Additives suitable for use in the present invention include reactive diluents, for example styrene oxide (epoxide of styrene), butyl glycidyl ether, 2,2,4-trimethylpentyl glycidyl ether, phenyl glycidyl ether, cresyl glycidyl ether or glycidyl esters of synthetic, highly branched, mainly tertiary, aliphatic monocarboxylic acids, and oxazoline group containing compounds; tougheners; plasticizers; extenders; microspheres; fillers, such as silica nanoparticles and reinforcing agents, for example coal tar, bitumen, textile fibers, glass fibers, asbestos fibers, boron fibers, carbon fibers, mineral silicates, mica, powdered quartz, hydrated aluminum oxide, bentonite, wollastonite, kaolin, silica, aerogel or metal powders, for example aluminum powder or iron powder, and also pigments and dyes, such as carbon black, oxide colors and titanium dioxide; fire-retarding agents; thixotropic agents; flow control agents, such as silicones, waxes and stearates, which can, in part, also be used as mold release agents; adhesion promoters; antioxidants and light stabilizers, the particle size and distribution of many of which may be controlled to vary the physical properties and performance of the inventive curable composition.

If present, at least one additive or mixtures of different additives can be used in the curable composition of the present invention in an amount in the range of 0.1 to 30 percent by weight, more preferably in an amount of 2 to 20 percent by weight and most preferably in an amount of 5 to 15 percent by weight, based on the total amount of the curable composition.

In one embodiment of the present invention solvents can be used to lower the viscosity of the curable composition. Preferable solvents are ethers such as diethylether and tetrahydrofuran, ketones such as acetone and ethyl methyl ketone, esters such as ethyl acetate and butyl acetate, chlorinated hydrocarbons such as chloroform and dichloromethane, aromatics such as benzene and chlorobenzene, amides such as dimethylformamide and methylpyrrolidone, alcohols such as methanol and isopropanol. More preferably, ester-type solvents and ketone-type solvents are used In a typical embodiment of the present invention the curable composition comprises, based on the total amount of the composition:
   a) from 20 to 99.9 percent by weight, more typically from 40 to 98 percent by weight, suitably from 50 to 95 percent by weight, for example from 60 to 90 percent by weight of at least one benzoxazine compound;
   b) from 0.1 to 20 percent by weight, more typically from 0.2 to 5 percent by weight, suitably from 0.3 to 3 percent by weight, for example from 0.5 to 1.5 percent by weight of at least one sulfonic acid ester of the present invention;
   c) from 0 to 60 percent by weight, more typically from 5 to 50 percent by weight, suitably from 10 to 30 percent by weight, for example from 15 to 25 percent by weight of at least one epoxy resin; and
   d) from 0 to 30 percent by weight, more typically from 2 to 20 percent by weight, suitably from 5 to 15 percent by weight, for example from 6 to 12 percent by weight of one or more additives.

By using the aforementioned sulfonic acid ester of the present invention, a benzoxazine-based curable composition can be obtained which exhibits a long pot-life, and a long open-time.

The term "pot-life" as used in the present invention refers to the length of time a curable composition retains a viscosity low enough for it to be suitable for processing.

The term "open-time" as used in the present invention refers to the elapsed time between the mixture of the curable composition to the curing.

For example it is possible to process the inventive curable composition, comprising at least one sulfonic acid ester of formulae (II) to (VI) at temperatures of 125° C. or less for more than 1 hour, without significantly increasing the viscosity of said composition.

Without being bound to theory it is believed that at temperatures of more (or equal) than 130° C. a thermal cleavage of the carbon-oxygen bond of the sulfonic acid ester of the present invention occurs, thus releasing the catalytically active form of said sulfonic acid ester. This active form is capable of catalyzing the curing reaction of the curable composition.

In one embodiment of the present invention the curable composition is cured at temperatures of at least 130° C., preferably at temperatures in the range of about 130° C. to about 160° C. and/or at pressures between 1 to 100 atm, preferably between 1 to 5 atm, and more preferably under atmospheric pressure.

As noted, the curable compositions of the present invention are in particular suitable as matrices for the preparation of reinforced material such as prepregs and towpregs and/or can be used in injection molding or extrusion processes.

In this regard, the invention also provides a cured reaction product of the curable composition, in particular cured reaction products comprising a plurality of fabric plies or unidirectional plies infused with the inventive curable composition before curing.

The aforementioned cured reaction products comprising a plurality of fabric plies or unidirectional plies can be produced by any method.

One preferred process for producing said cured reaction comprises the steps of:
  (a) providing a curable composition of the present invention into a closed mold containing a preform, comprising a plurality of fabric plies or unidirectional plies;
  (b) exposing the interior of the mold to a first temperature of 30° C. to 125° C. for a time sufficient to allow the curable composition to wet the preform;
  (c) curing the curable composition-impregnated preform within the mold at a second temperature of more (or equal) than 130° C., to form the cured reaction product.

Preferably the aforementioned process is a resin transfer molding process (RTM), a vacuum assisted resin transfer molding process (VaRTM) or a resin film infusion process (RFI).

In connection with a vacuum assisted resin transfer molding process (VaRTM), the present invention provides a process whose steps comprise:
  (a) providing a curable composition of the present invention in film form into a closed mold containing a preform, comprising a plurality of fabric plies or unidirectional plies;
  (b) exposing the interior of the mold to a first temperature of 30° C. to 125° C. under vacuum for a time sufficient to allow the curable composition to wet the preform;
  (c) curing the curable composition-impregnated preform within the mold at a second temperature of more (or equal) than 130° C. under vacuum to form the cured reaction product.

In connection with a resin film infusion process (RFI), the present invention provides a process whose steps comprise:
  (a) providing a preform into a closed mold containing an inventive curable composition in film form, where the preform comprises a plurality of fabric plies or unidirectional plies;
  (b) exposing the interior of the mold to a first temperature of 30° C. to 125° C. optionally under vacuum for a time sufficient to allow the curable composition to wet the preform;
  (c) curing the curable composition-impregnated preform within the mold at a second temperature of more (or equal) than 130° C. under vacuum to form the cured reaction product.

The second temperature used in the processes described above is preferably in the range of 130° C. to 160° C.

The fabric plies or unidirectional plies are preferably made of carbon, glass, aramid, boron, polyalkylene, quartz, polybenzimidazole, polyetheretherketone, polyphenylene sulfide, poly p-phenylene benzobisoaxazole, silicon carbide, phenol-formaldehyde, phthalate and napthenoate.

The carbon can be selected from polyacrylonitrile, pitch and acrylic, and the glass can be selected from S glass, S2 glass, E glass, R glass, A glass, AR glass, C glass, D glass, ECR glass, glass filament, staple glass, T glass and zirconium oxide glass.

As noted, another aspect of the present invention is the use of at least one sulfonic acid ester of the present invention as a heat-activatable catalyst for the curing reaction of benzoxazine compounds, wherein said benzoxazine compounds are preferably selected from benzoxazines of formula (B-I) to (B-XXII).

The invention is further illustrated by the following examples.

EXAMPLES

In the examples the following materials were used:

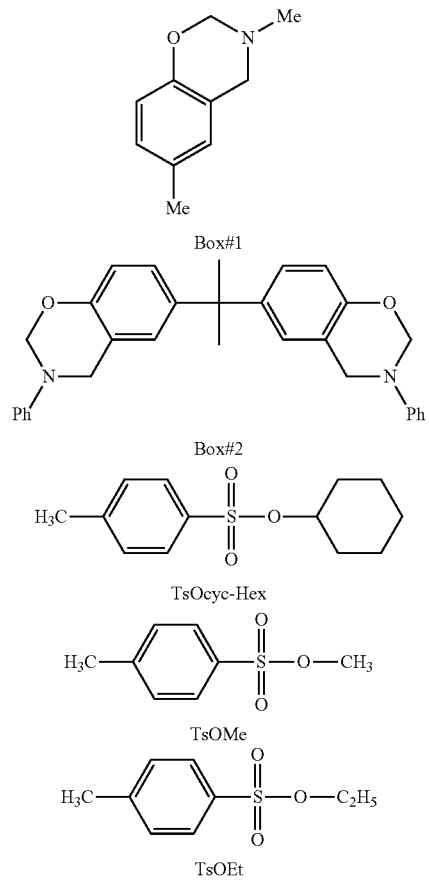

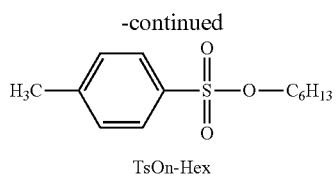

TsOn-Hex

Example 1-1

Box#1 (2.92 g, 13.0 mmol) and p-toluenesulfonic acid cyclohexyl ester (TsOcyc-Hex) (33.6 mg, 0.132 mmol) were mixed at 60° C. to obtain a homogeneous formulation. This formulation was divided into several portions and each portion was placed in a test tube. To the resulting test tubes Argon inlets were attached and each test tube was individually heated in an oil bath for a defined period of time.

The resulting samples were dissolved in deuteriated chloroform and analyzed by $^1$H-NMR to determine the conversion of Box#1. The results are shown in Table 1.

Comparative Example 1-2

Box#1 (2.92 g, 13.0 mmol) and p-toluenesulfonic acid methyl ester (TsOMe) (24.6 mg, 0.132 mmol) were mixed at 60° C. to obtain a homogeneous formulation. This formulation was divided into several portions and each portion was placed in a test tube. To the resulting test tubes Argon inlets were attached and each test tube was individually heated in an oil bath for a defined period of time.

The resulting samples were dissolved in deuteriated chloroform and analyzed by $^1$H-NMR to determine the conversion of Box#1. The results are shown in Table 1.

Comparative Example 1-3

Box#1 (2.92 g, 13.0 mmol) and p-toluenesulfonic acid ethyl ester (TsOEt) (26.4 mg, 0.132 mmol) were mixed at 60° C. to obtain a homogeneous formulation. This formulation was divided into several portions and each portion was placed in a test tube. To the resulting test tubes Argon inlets were attached and each test tube was individually heated in an oil bath for a defined period of time.

The resulting samples were dissolved in deuteriated chloroform and analyzed by $^1$H-NMR to determine the conversion of Box#1. The results are shown in Table 1.

Comparative Example 1-4

Box#1 (2.92 g, 13.0 mmol) and p-toluenesulfonic acid n-hexyl ester (TsOn-Hex) (33.6 mg, 0.132 mmol) were mixed at 60° C. to obtain a homogeneous formulation. This formulation was divided into several portions and each portion was placed in a test tube. To the resulting test tubes Argon inlets were attached and each test tube was individually heated in an oil bath for a defined period of time.

The resulting samples were dissolved in deuteriated chloroform and analyzed by $^1$H-NMR to determine the conversion of Box#1.

TABLE 1

Conversion of benzoxazine compound Box#1 at different temperatures

| | Examples | | | |
|---|---|---|---|---|
| | 1-1 | 1-2 (Ref.) | 1-3 (Ref.) | 1-4 (Ref.) |
| | Catalyst | | | |
| Conditions | TsOcyc-Hex | TsOMe | TsOEt | TsOn-Hex |
| 100° C. for 3 h | 0% | 17%[a] | 3% | ND |
| 120° C. for 1 h | 1% | 27% | ND | ND |
| 120° C. for 3 h | 16% | 61% | 13% | ND |
| 150° C. for 1 h | 76% | 85% | 18% | 0% |
| 150° C. for 2 h | 100% | 99% | 69% | 41% |

ND: not determined
[a]formulation not stable at 100° C.

Table 1 clearly demonstrates that the curing reaction of the benzoxazine-containing formulation of Example 1-1, comprising TsOcyc-Hex as a catalyst is extremely slow at temperatures of up to 120° C., whereas said formulation is cured efficiently at temperatures of about 150° C.

The comparative examples 1-2 to 1-4 show, that TsOMe catalyzes efficiently the curing reaction of the benzoxazine-based formulation of example 1-2 above 150° C. However, it also catalyzed the curing reaction below 120° C., leading to an unstable formulation which exhibits a poor processability. TsOEt does not catalyze the curing reaction of a benzoxazine-based formulation below 120° C., but its catalytic activity is insufficient to provide efficient curing of the benzoxazine-based formulation above 150° C.

Comparative example 1-4 demonstrates that by using TsOn-Hex as a catalyst, an extremely inefficient curing reaction occurs, thus making this formulation unsuitable for advanced composite part fabrication processes.

In summary, the benzoxazine-based formulation of example 1-1 is the only formulation which exhibits a long pot-life, a long open-time and a low processing viscosity at temperatures of about 120° C., and which can be cured at about 150° C. in short time periods.

Example-2

In all examples the thermomechanical analysis was performed using an EXSTAR6000 TMA/SS from Seiko Instruments. The curable formulation was poured into an aluminum cap, and a probe pin was plunged into it. During the curing reaction, a sinusoidal stress was applied to the sample by moving the probe pin up and down at a frequency of 0.01 (s$^{-1}$) and amplitude of 50 µm. The mechanical response was measured as a function of time.

Box#2 (0.203 g, 0.439 mmol) and p-toluenesulfonic acid cyclohexyl ester (TsOcyc-Hex) (11.1 mg, 43.6 µmol) were mixed at 110° C. to obtain a homogeneous formulation. One small portion of the homogeneous formulation was analyzed by thermomechanical analysis (TMA) at 120° C. The resulting time-modulus relationships are shown in FIG. 1.

Another small portion of the homogeneous formulation was analyzed by thermomechanical analysis (TMA) at 150° C. The resulting time-modulus relationships are shown in FIG. 2.

Comparative Example 2-1

Box#2 (0.203 g, 0.439 mmol) and p-toluenesulfonic acid cyclohexyl ester (TsOMe) (8.2 mg, 44 mmol) were mixed at 110° C. to obtain a homogeneous formulation.

One small portion of the homogeneous formulation was analyzed by thermomechanical analysis (TMA) at 120° C. The resulting time-modulus relationships are shown in FIG. 1.

Another small portion of the homogeneous formulation was analyzed by thermomechanical analysis (TMA) at 150° C. The resulting time-modulus relationships are shown in FIG. 2.

Comparative Example 2-2

Box#2 (0.203 g, 0.439 mmol) and p-toluenesulfonic acid cyclohexyl ester (TsOEt) (8.8 mg, 44 mmol) were mixed at 110° C. to obtain a homogeneous formulation.

One small portion of the homogeneous formulation was analyzed by thermomechanical analysis (TMA) at 120° C. The resulting time-modulus relationships are shown in FIG. 1.

Another small portion of the homogeneous formulation was analyzed by thermomechanical analysis (TMA) at 150° C. The resulting time-modulus relationships are shown in FIG. 2.

FIG. 1 demonstrates that by using TsOcyc-Hex as a catalyst, benzoxazine-based formulations are obtained which exhibit a much longer open-time than comparable formulations, comprising TsOMe as a catalyst.

FIG. 2 demonstrates that benzoxazine-based formulations comprising TsOcyc-Hex as a catalyst can be cured more efficiently and more rapidly than comparable formulations, comprising TsOMe or TsOEt as a catalyst.

The invention claimed is:

1. A curable composition comprising:
   a) at least one benzoxazine compound, and
   b) at least one mono-sulfonic acid ester of formula (I),

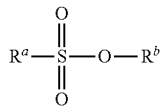

formula (I)

wherein each $R^a$ is independently selected from $C_1$-$C_{40}$ alkyl groups, $C_1$-$C_{40}$ haloalkyl groups, $C_3$-$C_{40}$ cycloalkyl groups, $C_{3-40}$ alkenyl groups, $C_{3-40}$ alkynyl groups, $C_7$-$C_{40}$ aralkyl groups, or $C_6$-$C_{40}$ aryl groups, wherein said alkyl, haloalkyl, cycloalkyl, aralkyl and aryl groups are optionally substituted and $R^b$ is a bicyclic alkyl group, comprising 10 to 30 carbon ring atoms, wherein said bicyclic alkyl group is substituted by at least one substituent selected from oxo, hydroxyl, amine, cyanide, halogen, linear, branched, saturated or unsaturated $C_1$-$C_{40}$ alkyl, linear, branched, saturated or unsaturated $C_1$-$C_{40}$ haloalkyl, $C_7$-$C_{40}$ aralkyl, or $C_6$-$C_{40}$ aryl.

2. The curable composition of claim 1, wherein each $R^a$ of formula (I) is independently selected from $C_1$-$C_{40}$ alkyl groups selected from methyl, ethyl, or trifluoromethyl, or optionally substituted $C_7$-$C_{40}$ aralkyl groups or $C_6$-$C_{40}$ aryl groups selected from phenyl, ortho-nitrophenyl, meta-nitrophenyl, para-nitrophenyl, ortho-tolyl, meta-tolyl, para-tolyl, 2,4,6-trimethylphenyl, ortho-trifluoromethylphenyl, meta-trifluoromethylphenyl, para-trifluoromethylphenyl, ortho-methoxyphenyl, meta-methoxyphenyl, or para-methoxyphenyl.

3. The curable composition of claim 1, wherein the molar ratio of benzoxazine moieties to sulfonate ester groups ($R^aSO_3$—*) is in the range of 90:10 to 99.9:0.1.

4. The curable composition of claim 1, comprising:
   a) from 20 to 99.9 percent by weight of the at least one benzoxazine compound,
   b) from 0.1 to 20 percent by weight of the at least one mono-sulfonic acid ester;
   c) from 0 to 60 percent by weight of at least one epoxy resin; and
   d) from 0 to 30 percent of at least one additive.

5. A cured reaction product of the curable composition of claim 1.

6. The cured reaction product of claim 5 infused within a plurality of fabric plies or unidirectional plies.

7. A process for producing the cured reaction product of claim 6, steps of which comprise:
   (a) providing a curable composition according to claim 1 into a closed mold containing a preform comprising a plurality of fabric plies or unidirectional plies;
   (b) exposing the interior of the mold to a first temperature of 30° C. to 125° C. for a time sufficient to allow the curable composition to wet the preform;
   (c) curing the curable composition-impregnated preform within the mold at a second temperature of at least 130° C. to form the cured reaction product.

8. The process of claim 7, wherein the process is a resin transfer molding process (RTM), a vacuum assisted resin transfer molding process (VaRTM) or a resin film infusion process (RFI).

* * * * *